INVENTOR.
Richard E. Trost

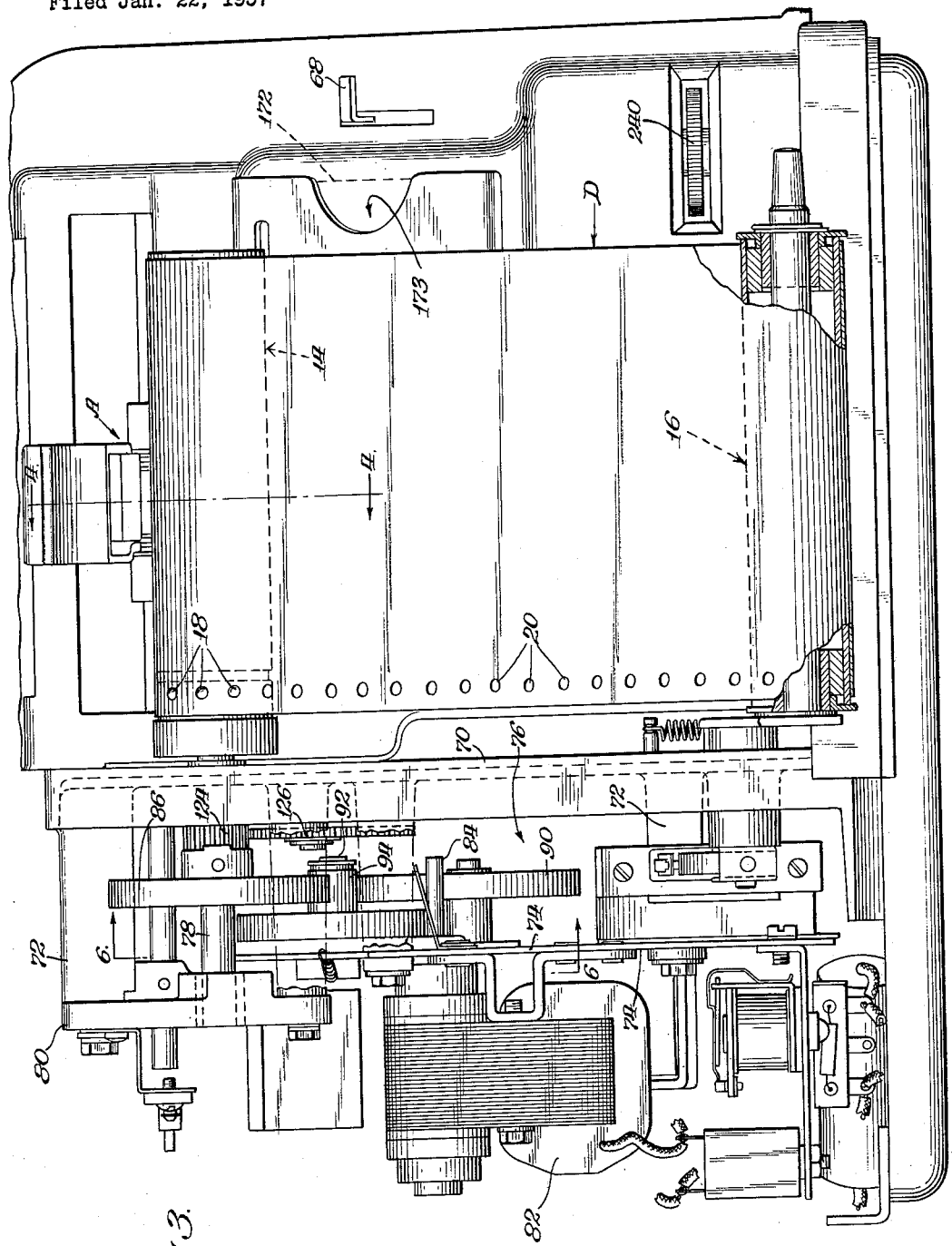

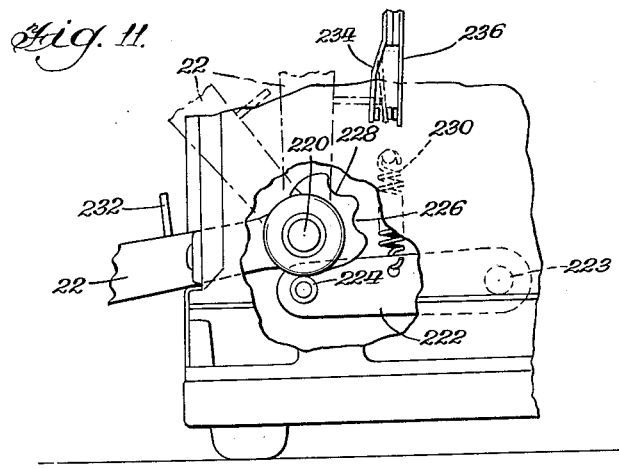
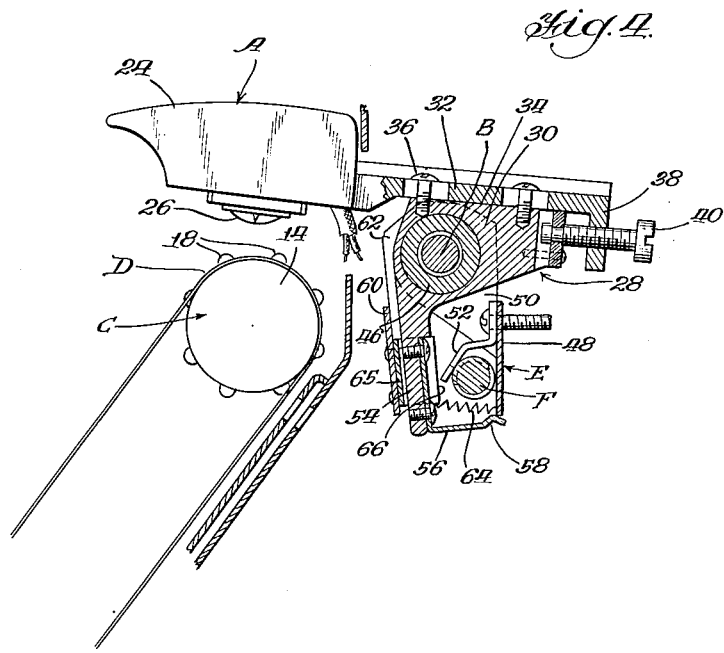

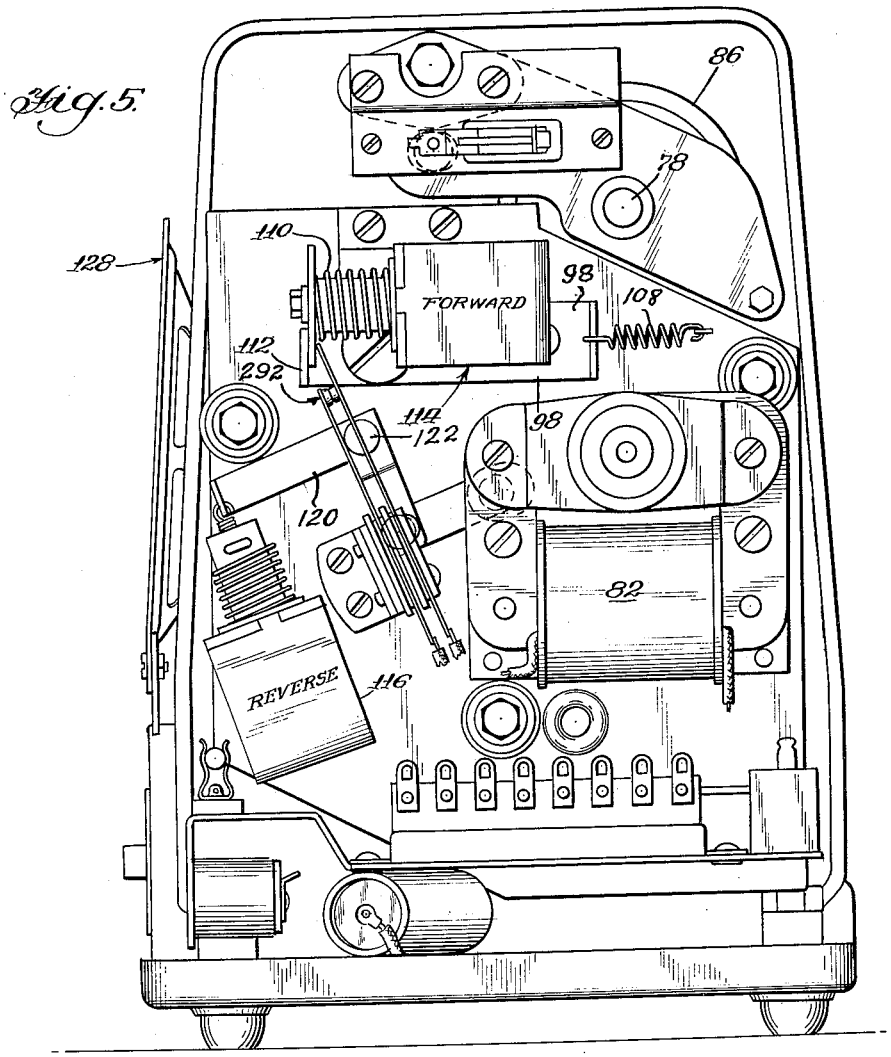
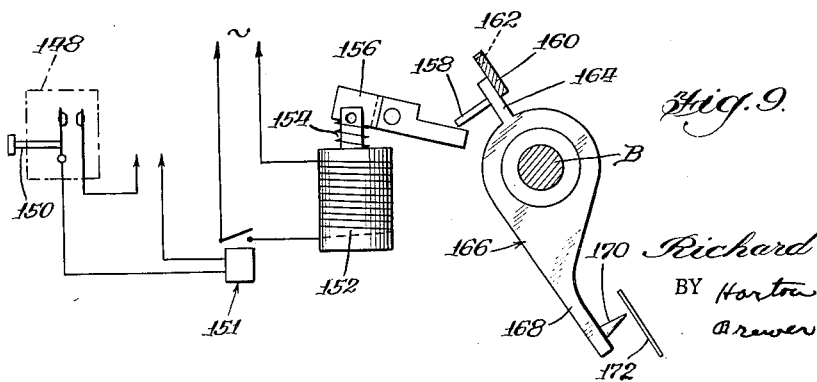

May 28, 1963  R. E. TROST  3,091,668
DICTATING MACHINE

Filed Jan. 22, 1957  6 Sheets-Sheet 5

Fig. 7. FORWARD DRIVE

REVERSE DRIVE

INVENTOR.
Richard E. Trost
BY Horton, Davis,
Brewer & Brugman
Attys.

May 28, 1963 R. E. TROST 3,091,668
DICTATING MACHINE
Filed Jan. 22, 1957 6 Sheets-Sheet 6

INVENTOR.
Richard E. Trost
BY Horton, Davis,
Brewer + Brugman
Attys.

United States Patent Office 3,091,668
Patented May 28, 1963

3,091,668
DICTATING MACHINE
Richard E. Trost, Dundee, Ill., assignor, by mesne assignments, to Victor Comptometer Corporation, Chicago, Ill., a corporation of Illinois
Filed Jan. 22, 1957, Ser. No. 635,295
8 Claims. (Cl. 179—100.2)

The present invention relates to apparatus for recording and reproducing sounds, and more particularly dictating machines.

The invention has particular adaptation to electrically operated and controlled machines of the above noted kind.

Dictating machines and recording machines both record sound in response to voice impulses of the operator, and reproduce the sounds thus recorded. In the case of an ordinary recording machine, the machine may be turned on to operating condition and left in that condition throughout a certain predetermined period during which it will record, or reproduce, continuously without any additional controlling operations performed thereon, nor need it be controlled by such controlling operations. On the other hand, a dictating machine is equipped with certain types of additional control means for performing control operations on the machine characteristic of the nature of the dictating operation. For example, in a dictating operation the operator normally speaks only a portion of the total time and during the times he is speaking, the machine is turned on, but while he is not speaking the machine may well be turned off. It is also desired to reproduce portions of dictated material, during a dictating operation, as is known.

The control means for use in such dictating operation should be arranged for the greatest convenience of the operator and to his least distraction, to enable him to concentrate on the subject matter of the dictating operation. These controls should be located at the most convenient location for manipulation, such as by the hand.

The present invention finds particular utility in connection with magnetic dictating machines, although the invention is not limited to this specific kind of machine. The machine utilizes a record medium for recording thereon of signals corresponding to voice impulses of the operator. Dictating machines now in use, for the most part at least, utilize a hand piece which is at a remote distance from the main portion of the machine, for receiving the voice impulses for transmission of the corresponding signals to the record medium. This hand piece includes what may be designated a mouth piece for receiving the voice impulses. In the present instance, since the machine is of electrical nature, the mouth piece is a microphone and for convenience herein it will be designated such, although it is to be understood that the invention in its broader aspects will cover other devices equivalent to a microphone.

The record medium is in the form of a belt and is mounted in the machine for movement in a predetermined endless path, in either forward or reverse direction. Cooperating with the record medium is a transducer for recording the signals on the record medium. This transducer moves in a path transverse to the direction of movement of the record medium, whereby a path of helical form containing the signals thus recorded, is traced on the record medium.

In a dictating operation the record medium moves for example in a forward direction and the transducer moves in a corresponding direction in its transverse path of movement. During the course of the dictating operation, as was explained above, it is desired to stop the movement of the record medium during the times that the operator is not speaking. It is also desired, at least at times, to play back portions of material previously dictated and recorded and for the latter operation it is necessary to reverse the movement of at least the transducer, and it is found convenient to also reverse the movement of the record medium. The transducer may be reversed manually, if the distance for it to be reversed is substantial, but if the distance to be reversed is small the record medium and transducer may be left in interconnected driving relation and the two reversed until the transducer is disposed at the desired point relative to the record medium for playing back the material desired. When the reversing operation as just described has been completed, the record medium and transducer are again moved in forward direction for playing back or reproducing the material desired. During the course of this playing back or reproducing operation, the signals previously recorded must not be obliterated or impaired, so that they may be picked up in a subsequent transcribing operation. The control elements for controlling these various operations have been mounted directly in the main portion of the machine in previous kinds of dictating machines, but such an arrangement is accompanied by serious inconveniences and disadvantages in that the operator is distracted in reaching to such controls. The operator of the dictating machine should be as free as possible of distraction so as to be able to concentrate on the subject matter of the dictating operation. In the present case the controls of the character mentioned are disposed in the hand piece which is at a remote position from, but connected to, the main portion of the machine, or the machine proper.

In the course of the dictating operation, as has heretofore generally been the case, it is desired to utilize a logging record in the dictating operation. Such a record includes, for example, a card or sheet of paper arranged in certain predetermined relation with respect to the record medium so that an indication may be made thereon so correlated with the dictating operation as to indicate to the transcribing operator a certain message with respect to the dictated contents, such as to make a correction, omit a portion, add a portion, in the transcribed material. Previous machines provide for making the indications or notations on the logging record manually, as by the operator reaching to the logging record which is mounted on the machine proper, but in such case a distraction is present in the very fact of reaching to the machine. In the present instance an indication may be made on the logging record by a means which is under electrical control. The control element for this electrical control in the present instance is also incorporated in the hand piece.

Such control elements present quite a problem from the standpoint of their incorporation in the hand piece in view of the desired manner of control thereof by the operator. For example, while the machine is in dictating condition, the transducer is energized for recording signals on the record medium. In other conditions of the machine, the transducer must not of course record signals thereon since in doing so the signals previously recorded would be obliterated or impaired. Hence it is necessary that in the operations other than the dictating operation the transducer be de-energized. For example, in the reversing operation when the record medium and the transducer remain in interconnected relation and are both reversed, the transducer retraces the helical path previously made and the transducer, being de-energized, in no wise affects the signals previously recorded. Then in the reproducing or playing back operation, the transducer retraces again, but in forward direction, the helical path previously made, but in this operation the signals previously recorded are reproduced, but they are not obliterated or otherwise impaired. The various conditions of the machine in these different operations must, at least in certain cases, be mutually exclusive; that is, when the machine is intended to be or nominally is in one condition, it is disabled from performing any other operation as if in another condition. The control elements for controlling these operations are incorporated in the hand piece to the maximum ease and convenience of the operator of the machine.

To the end that the various control operations be mutually exclusive, it is preferred that these operations be under the control of a single manipulable element such as a lever or button that can be easily manipulated by the hand, such as by the thumb. To the end also of facilitating and simplifying the control operation, the arrangement wherein these operations are controlled by a single manipulable element, eliminates the necessity for the operator to perform the operations by both hands or by several fingers, whereby his full attention may better be applied to the subject of the dictation.

An additional consideration to be taken into account is that the machine should be so constructed and arranged that if it should accidentally revert to a condition other than that intended, there would be no adverse effect such as loss of signals previously recorded. A situation of the kind in question may be as follows: Assume a dictating condition of the machine and the electric cord leading to the machine should become unplugged accidentally, the transducer reverts to a non-recording or de-energized condition so that in a later transcribing operation, the operator could not accidentally leave the transducer in a recording condition which would obliterate the signals previously recorded.

An object, therefore, of the present invention, in its broader aspects, is to provide a dictating machine of novel character providing all of the advantages indicated above and eliminating the disadvantages noted.

Another object is to provide a dictating machine including a portion such as a hand piece, remote from the machine proper or the main part of the machine, having control means for performing a plurality of control operations in the machine.

A further object is to provide a dictating machine including a portion such as a hand piece, remote from the machine proper or the main part of the machine, having control means for performing a plurality of control operations in the machine, in which the operations are under the control of a single manipulable element.

A further object is to provide a dictating machine having a record medium and a transducer arranged for recording signals on the record medium and arranged for forward movement as well as rearward movement, in which means for controlling such movements are incorporated in a portion of the machine remote from the machine proper, such as a hand piece.

Another and more specific object of the invention is to provide a dictating machine of the character above noted, in which the record medium is of magnetic nature and the transducer includes an electromagnet, wherein control means is provided, as in the hand piece or equivalent remote portion of the machine, for de-energizing the transducer when the transducer is in any condition other than a dictating or recording condition.

A further object is to provide a dictating machine having a magnetic record medium and a magnetic transducer for recording signals thereon, wherein a remote portion of the machine such as a hand piece is provided and a microphone is incorporated in the hand piece, while a speaker is incorporated in the machine proper, wherein the signals recorded on the record medium can be played back or reproduced, selectively through the microphone or through the speaker and the microphone.

A still further object is to provide a dictating machine of the general nature referred to above in which the elements for controlling the various operations are incorporated in a remote portion of the machine, such as a hand piece, in which the hand piece may be detached from the machine proper for facilitating attachment thereto of another control device such as is conveniently used in a transcribing operation.

Other objects and advantages of the invention will appear from the following detailed description taken in conjunction with the accompanying drawings in which:

FIG. 3 is a front view of the machine with the casing removed;

FIG. 4 is a partial sectional view, taken approximately on line 4—4 of FIG. 3;

FIG. 5 is an end view of the interior of the machine, taken from the left end of FIG. 1, but with the casing removed;

FIG. 7 is an illustration of certain drive transmitting wheels as seen in FIG. 6, in one condition of operation;

FIG. 9 is a semi-diagrammatic illustration of a logging element and circuit portion controlling it, employed in the machine;

FIG. 11 is a partial view of switch means controlled by the record medium holder;

Figure 1:
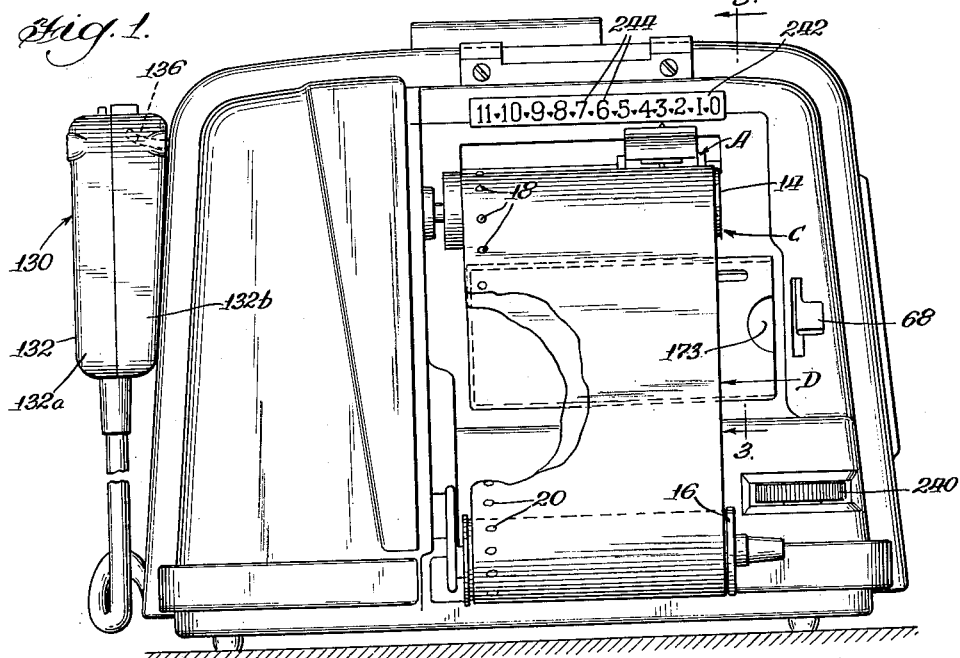
FIGURE 1 is a front elevational view of a dictating machine in which the present invention is incorporated, having a cover element normally disposed thereon, removed.

The present invention is shown as being embodied in a magnetic type of dictating machine, as was mentioned above. The machine herein disclosed is generally of the kind disclosed in the co-pending United States Letters Patent application of Alfred E. Lorenz, Serial No. 408,907, filed February 8, 1954, now Patent No. 2,926,920, dated March 1, 1960. It will be understood by those skilled in the art that the invention is not limited to such a machine, but may be embodied to advantage in various types of dictating machines. The illustrated type of machine, generally described, usually comprises, as shown in FIGS. 1–4, a transducer head A, a rod or other suitable support B therefor, a drivable carrier C for removably carrying and driving a record medium D, and a head-traversing drive connection E including a rotatable threaded shaft or feed screw F. In such a dictating machine the head A is pivotally and slidably mounted on the support B for cooperation with the record medium D on the carrier C. The transducer head is thus swingable in a direction substantially normal to the record medium between a transducing position and a non-transducing position with respect to the record medium on the carrier C. When the head A is in its transducing position, it is movable by the head-traversing drive connection E along the support B to traverse the record medium D for recording or reproducing signals thereon. When the head is in its non-transducing position, it is manually reciprocable along the support B to position the head for a subsequent traversing of all or a portion of the record medium.

As is well-known in the art and disclosed in the above-mentioned application, the illustrated dictating machine comprises suitable supporting and casing means, frame construction, and specific mechanical construction, none of which per se constitutes any part of the present invention and none of which is therefore described in detail herein. It may be well, however, to point out briefly that in the illustrated machine the transducer head A is of the magnetic type; the carrier C comprises rotatable drive and tension rolls; the record medium D is an endless belt adapted to have magnetic signals recorded thereon and to have such signals reproduced by the transducer head A; the rotatable drive roll of the carrier C, the rod B, and the rotatable feed screw F are mounted parallel to one another with the rod above and slightly forwardly of the feed screw and with the drive roll forwardly of and slightly below the rod; and the driving means is adapted to rotate the carrier C and the feed screw F in timed relationship, whereby during a transducing operation the transducer head traces a helical path on the record medium with the convolutions of the path spaced transversely of the record medium.

As already mentioned, the carrier C includes drive and tension rolls, now designated by the reference numerals 14 and 16, respectively. The drive roll 14 is provided with a plurality of teeth or projections 18 extending radially outwardly from its peripheral surface near an end of the roll for drivingly engaging in spaced perforations 20 in the belt along one of its margins. The tension roll 16 is mounted on a pivotally mounted arm 22 and is thus adapted to swing between an upper position shown in broken lines in FIG. 2 and a lower or belt tightening or tensioning position shown in full lines in FIGS. 1 and 2. It also is releasably positionable in an intermediate, belt receiving and removing position, shown in FIG. 2, by means referred to below and illustrated in FIG. 11.

The transducer head A and carriage therefor are preferably like those disclosed in the co-pending United States Letters Patent application of Alfred E. Lorenz, Serial No. 489,201, filed February 18, 1955, now Patent No. 2,970,841. Such a transducer head comprises a suitable casing 24 and a transducer therein having a tracer member 26 depending therefrom outside of the casing and being relatively thin in a direction transversely of the belt on the carrier C. The transducer head A is adapted to be mounted on a carriage 28 in such a manner that the tracer member 26, when the head A is in its transducing position, is closely adjacent the drive roll 14 for lightly engaging the record medium thereon. In the illustrated dictating machine, the engagement between the tracer member and record medium for optimum transducing relationship therebetween occurs in the vertical plane including the axis of the drive roll 14.

In the illustrated embodiment of the invention the carriage 28 may be of the general type disclosed in Patent No. 2,926,920, referred to above, but it also includes certain details of construction disclosed in Patent No. 2,970,841, mentioned. Certain of those details of construction disclosed in the applications mentioned may be omitted from the description herein, but for the sake of convenience, a description of the general operation of the carriage will be given herein. The carriage 28 includes a main body portion 30 mounted for movement in the manner described below and serving as the means directly to which the head A is secured. The transducer head A has a rearwardly extending arm 32 fitted to the upper flat surface 34 of the body portion 30 and secured thereto by suitable means such as screws 36. The arm 32 is extended rearwardly beyond the body portion 30 where it has a down-turned end portion 38 in which is mounted an adjusting screw 40. The adjusting screw 40 is operable for adjusting the transducer head A forwardly and rearwardly, i.e., in transverse direction relative to the drive roll 14, as viewed in FIGS. 2 and 4, in the manner and for the purpose disclosed in my co-pending United States Letters Patent application, Serial No. 623,017, filed November 19, 1956, now Patent No. 3,039,777, dated June 19, 1962.

The carriage 28, shown in detail in Patent No. 2,970,841, referred to above, is mounted for movement transversely of the belt and consequent movement of the transducer head A in that direction. The guide rod B which extends transversely of the machine is suitably mounted in frame elements of the machine. The specific means for mounting the carriage on the guide rod includes a hub 46 receiving the guide rod and slidable thereon. Associated with the carriage 28 is means for feeding the carriage and thereby the transducer head A along the guide rod B. The carriage includes a depending arm 48 having transverse tabs 50 (FIG. 4) receiving the hub 46 and enabling relative pivotal movement thereon. The lower end of the arm 48 has a plate 52 secured thereto which with the lower extremity of the arm 48 cooperates with the feed screw F. This feed screw is journalled in suitable bearings in suitable frame elements. The plate 52 and the lower extremity of the arm 48 are on effectively opposite sides of the feed screw F whereby the arm 48 is normally maintained or restrained by the feed screw against pivotal movement relative to the axis of the guide rod. The surfaces on the plate 52 and arm 48 that engage the feed screw do not effect threading therewith for movement of the carriage, the surfaces being broad and engaging the outer extremities of the threads on the screw. The feed screw F is driven by suitable means referred to below, and deriving its drive from the same motor that drives the drive roll 14.

The carriage 28 in addition to the elements mentioned above includes also a depending arm 54 which may be an integral extension of the body portion 30. The lower end of this arm has mounted thereon a leaf spring 56 with a detent or latch 58 engageable with the lower end of the arm 48. This detent releasably engages either side of the arm 48 for retaining the head A in a corresponding position. The transducer head is movable from the transducing position shown in FIG. 2 to a non-transducing position raised therefrom, shown in FIG. 4 as by rotating the transducer head clockwise about the guide rod B. In the lower or transducing position of the unit the detent 58 engages the rear side of the arm 48 and in the non-transducing position it engages the front side, in both cases releasably engaging the arm for normally retaining the transducer head A in the set position but enabling it to be moved to the opposite position when the necessary external force is applied thereto.

A third arm 60 is included in the carriage and is mounted on the hub 46 by means of lateral tabs 62 having aligned apertures receiving the hub. This arm is on the same side of the feed screw F as is the arm 54 and on the outside or front side of the latter. A tension spring 64 interconnects the lower ends of the arms 60 and 48. Secured on the arm 60 is a plate-like element 65 having an edge 66 (FIG. 4) engageable with the threads on the feed screw F for feeding the carriage and transducer head A along the guide rod B. When the head is in its transducing position the edge 66 engages the threads of the screw, and when the head is raised to non-transducing position, the edge is out of engagement with the threads, enabling free sliding movement of the carriage and head along the guide rod as when so manually manipulated.

The dictating machine provides means for tuning which may be of the character disclosed in my co-pending application indicated above. The details of the tuning arrangement are omitted from the present application for convenience, but reference is made to a finger grip piece 68 (FIGS. 2 and 3) by which the tuning is accomplished.

A brief and general description of the tuning arrangement is given herein for convenience, but further description, of the details of construction utilized, may be obtained from my co-pending application mentioned. As explained above, the tracer member 26 on the transducer head A traces a helical path on the record medium along which the signals are recorded. The convolutions of this path are spaced apart, with blank spaces between the convolutions. The tuning arrangement is for the purpose of aligning the tracer member with one or another of the convolutions of the path. To accomplish this the transducer head is moved transversely of the direction of movement of the record medium, namely, in the path parallel with the axis of the drive roll 14. When the record medium or belt D is removed from the machine and again replaced on a machine for transcribing it, it may be rotated about a transverse axis, i.e., end-for-end, and be displaced angularly from the position it assumed at the completion of the dictating operation. If the belt should be so displaced, the transducer head, which is positioned according to the threads on the feed screw F, would be positioned so that the tracer member is disposed between adjacent convolutions. However, with the tuning arrangement the transducer head may be shifted in one direction or the other for registering the tracer member with the intended convolution of the signal path.

Figure 6:
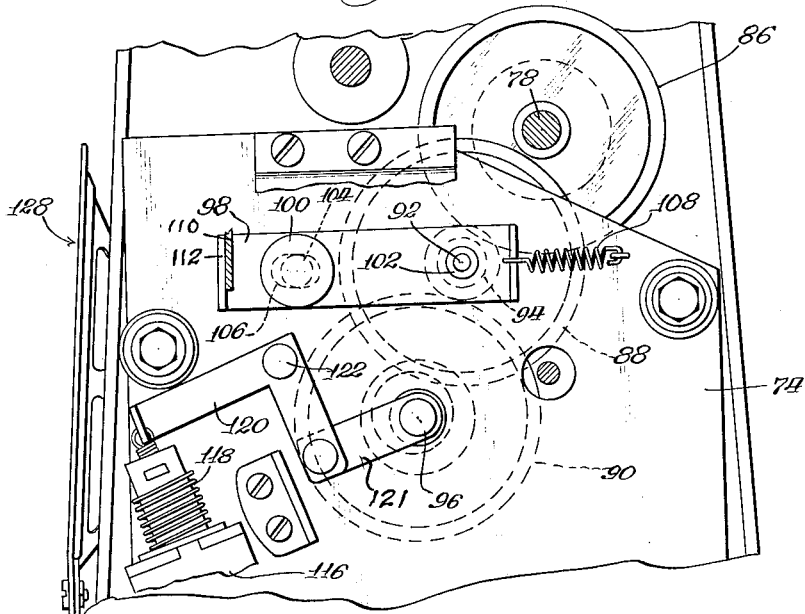
FIG. 6 is a view of a certain portion of the interior of the machine, taken approximately at the location of the line 6—6 of FIG. 3, but with the casing of the machine removed; this view is oriented similarly to FIG. 5.

FIGS. 3, 5, and 6 show certain structural elements of the machine utilized for mounting various ones of the movable parts including the drive roll 14 and the means for driving the roll. The machine is provided with a suitable frame having certain elements appropriately positioned for imparting the desired strength and for supporting certain of the moving parts. The frame includes a vertical transverse element 70 having a plurality of spacer means or bracket elements 72 extending therefrom and a panel or plate 74 mounted on and supported by the extended ends of the bracket elements 72. Between the transverse partition element 70 and the panel 74 is an area that may for convenience be designated a space 76 in which are a number of operating elements. The vertical transverse frame element 70 is disposed to one side of the central portion of the machine so that the drive roll 14 and the cooperating roll 16 may extend therefrom in one direction and be within the confines of the adjacent portion of the machine. The drive roll 14 includes suitable construction for supporting the belt D, as will be understood by those skilled in the art, and also includes a shaft 78 journalled in the frame element 70 and in another bracket element 80 suitably supported as by one of the upper bracket elements 72 adjacent the top of the machine. The drive roll shaft 78 is journalled in these two spaced apart portions or elements of the frame and thus is provided a two-point support which otherwise extends unsupported from the frame element 70 for enabling placement of the belt D thereon and removal therefrom.

Figure 8:
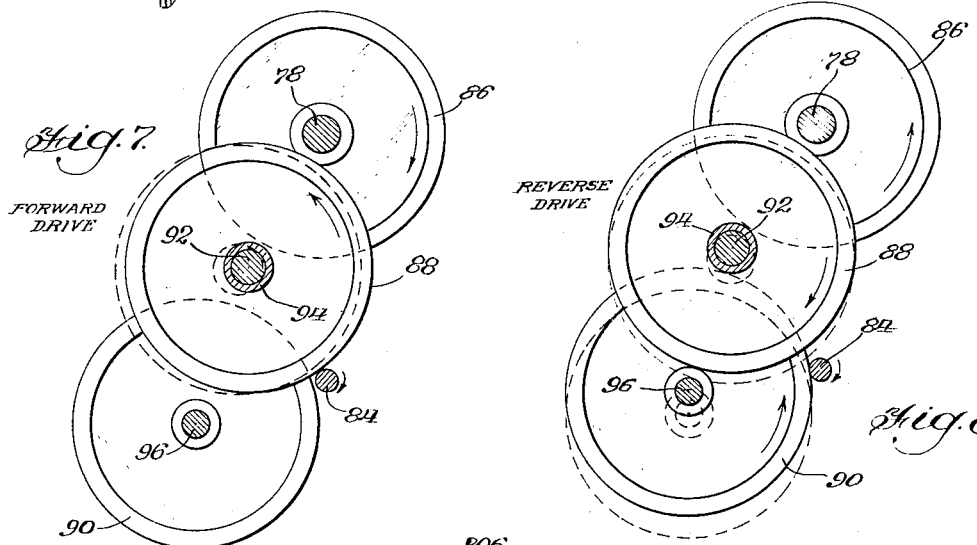
FIG. 8 is a view similar to FIG. 7 but with the drive transmitting wheels in a different condition.

The drive for the roll 14, and for other moving elements of the machine, is provided by a motor 82 of suitable and well-known type and may be of unidirectional drive, the reversing operation for the various parts as referred to above being provided by a reversing drive train. The electric motor 82 is suitably mounted on the frame and preferably on the panel 74 on the side thereof opposite the frame element 70 or space 76. The motor 82 is provided with a drive shaft 84 which extends into the space 76 and is arranged for driving the driving elements shown in FIGS. 3, 6, 7, and 8. These driving elements are in the form of friction drive wheels 86, 88, and 90 which form drive trains between the motor and the shaft 78 of the drive roll 14. The friction wheel 86 is fixedly mounted on the shaft 78 of the drive roll 14 by suitable means such as by keying. The friction wheel 88, which may also be termed an idler wheel, is provided with a friction hub 94 and is movable to and from a position at which the wheel 88 frictionally engages drive shaft 84 and the hub 94 frictionally engages the friction wheel 86 for imparting forward drive to the latter and to the drive roll 14. The forward drive engagement is that illustrated in FIG. 7. The idler wheel 88 is rotatably mounted on a stub shaft 92 suitably mounted on a movable bracket referred to below. The hub 94 of the idler wheel is frictionally engageable, as shown in FIG. 8, with the friction wheels 86 and 90 for imparting reverse drive to the wheel 86 and the drive roll 14. The idler friction wheel 88 is mounted for movement into and out of the desired drive transmitting position by means to be described hereinbelow and for the present it may be stated that it has a normal inoperative position such as shown in dotted lines in FIG. 7. The full line position is that it assumes in forward drive position, as indicated above.

The movement of the idler wheel 88 to forward drive position brings the outer periphery of the wheel into friction driving engagement with the motor drive shaft 84 and the hub 94 into friction driving engagement with the outer periphery of the friction wheel 86. The directions of rotation of the various elements in such position are as indicated by the arrows in FIG. 7, namely, the drive shaft 84 rotates clockwise, the idler wheel 88 rotates counterclockwise and the friction wheel 86 rotates clockwise and drives the roll 14 in that direction. The friction wheel 86 and the motor drive shaft 84 are fixed in location, that is, they are not movable transaxially. However, the idler friction wheel 88 is so movable as was just explained.

Attention is next directed to FIG. 8 which shows the position of the various elements when reverse drive is imparted to the friction wheel 86 from the motor drive shaft 84. To control such reverse movement, the friction drive wheel 90 is moved into and out of drive transmitting position. This friction wheel 90 is mounted for such movement in a manner and by means described hereinbelow and it may be stated at this point that it moves from a normal inoperative position shown in dotted lines in FIG. 8 to an operative, drive transmitting position shown in full lines. When it is desired to so transmit the reverse drive to the friction wheel 86 and thus to the drive roll 14, the friction wheel 90, which may also be designated as a reverse idler wheel, is moved from its dotted line position to its full line position (FIG. 8). In the dotted line position, as will be noted, it is out of engagement with the drive shaft 84 of the motor, but upon movement to the full line position it engages the drive shaft in friction driving engagement therewith, and continued movement of this friction wheel 90 after so engaging the drive shaft 84, which continued movement is arcuately about the axis of the drive shaft, causes the outer peripheral surface of the wheel 90 to engage the hub 94 of the friction wheel 88, and still further movement of the wheel 90 moves the friction wheel 88 in the same direction until the hub 94 engages the drive wheel 86. The drive then is from the drive shaft 84 to the idler wheel 90, to the hub 94 and from the latter to the drive wheel 86. The directions of rotation of the elements are as indicated by the arrows, namely, the drive shaft 84 rotates in clockwise direction, as it does at all times; the reverse idler wheel 90 rotates counterclockwise, the hub 94 (which is on the idler wheel 88) rotates clockwise, and the idler wheel 86 and hence the drive roll 14 rotate counterclockwise.

The reverse idler wheel 90 is mounted on a stub shaft 96 supported in a movable lever referred to below. The friction wheels 86, 88, and 90 and the motor drive shaft 84 are thus disposed in the space 76 between the panel 74 and the vertical frame element 70.

The idler friction wheel 88 is supported on the panel 74 by means of its mounting directly on a slide plate 98 (FIGS. 5 and 6), this plate being mounted for sliding movement for moving the friction wheel into and out of drive transmitting position. The plate is provided with hangers 100 and 102, the former including a pin 104 fixed on the panel 74 and received in a horizontal slot 106 in the plate 98. The stub shaft 92 of the friction wheel 88 is supported in the hanger 102 on the plate and is movable in an opening in the panel 74 in response to movement of the slide plate 98. The plate 98 is biased to a first position in which the friction wheel 88 is in drive transmitting position (to the right—FIGS. 5 and 6), by a tension spring 108 having one end connected with the slide plate and its other end connected to the fixed panel 74. The slide plate 98 and the friction wheel 88 mounted thereon are biased to the opposite position, namely, the position in which the friction wheel 88 is out of drive transmitting relation, by a spring pressed armature 110 (FIG. 5) which engages a flange 112 on the slide plate 98. The armature 110 is included in a solenoid 114 of suitable and known construction mounted on the panel 74. In normal position of the solenoid in which the latter is de-energized, the spring pressed armature biases the slide plate 98 to inoperative position (to the left, FIGS. 5 and 6) in which the idler friction wheel 88 is out of drive transmitting engagement, i.e., in the dotted line position of FIG. 7. Upon energization of the solenoid 114, in the operation of the device as described below, the biasing pressure of the armature is relieved from the slide plate 98, and the latter is moved to the right under the action of the tension spring 108 and the idler friction wheel 88 is then moved to the full line position (FIG. 7) which is the forward drive position. The solenoid 114 utilized in imparting forward drive to the drive roll is energized in both the dictating operation and the playing back or "listening" position as will be explained below and particularly in connection with the circuit of FIG. 12.

The means for mounting the reverse idler friction wheel 90 and moving it into and out of drive transmitting position is illustrated in FIGS. 5 and 6 and includes a solenoid 116. This solenoid includes a spring pressed armature 118 connected with an arm of a bell crank lever 120 pivoted at 122 on the panel 74. The other arm of the bell crank lever is interconnected by means of a link 121 with the stub shaft 96 on which the reverse idler friction wheel 90 is rotatably mounted. Upon energization of the solenoid 116 the armature 118 is retracted and the bell crank 120 is rocked in counterclockwise direction, resulting in movement of the reverse idler wheel 90 from the inoperative dotted line position (FIG. 8) to the upper full line operative position, as described above. A suitable opening in the panel 74 is provided for enabling movement of the stub shaft 96 therein. When the solenoid 116 is de-energized the armature is spring pressed outwardly (upwardly, FIGS. 5 and 6) which results in rocking of the bell crank lever 120 in clockwise direction, this action being aided by gravity acting on the reverse idler wheel 90.

The drive for the lead screw F is derived from the electric motor 82 directly from the shaft 78 of the drive roll 14. A gear 124 is mounted on and secured to the shaft 78 as by keying it thereon, and meshes with an idler gear 126 which in turn meshes with another gear (not shown) mounted on and keyed to the shaft of the lead screw F. Thus synchronized drive is established between the drive roll 14 which drives the record medium D and the lead screw F through which drive is derived for the transducer head A in the movement of the latter transverse to the movement of the record medium, namely, in the direction of the axis of the drive roll 14.

Figure 2:
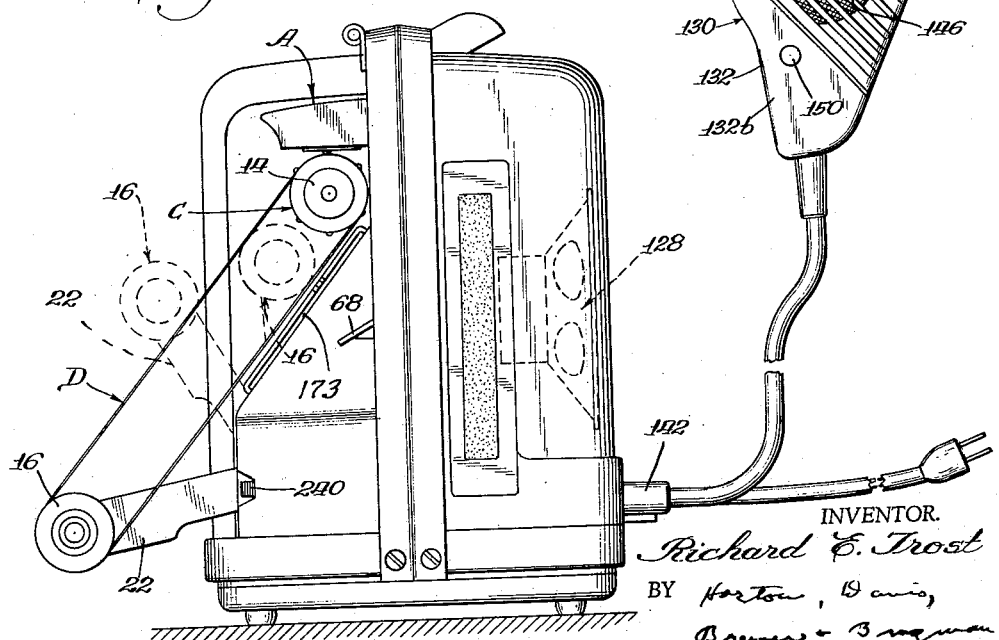
FIG. 2 is an end view taken from the right of FIG. 1.

A speaker 128 of suitable and known type is, as shown in FIGS. 2 and 5, provided in the machine and is connected in circuit in a manner described below in the description of the operation and of the circuit of FIG. 12.

Figure 10:
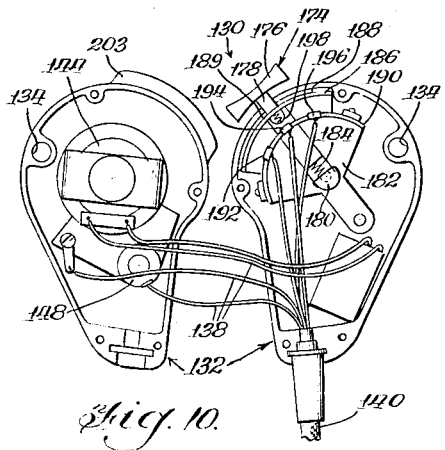
FIG. 10 is an interior view of the parts making up the hand piece.

Attention is directed next to the hand piece 130, shown assembled in FIGS. 1 and 2 and disassembled in FIG. 10. This hand piece includes a microphone for receiving the voice impulses from the operator and transmitting signals corresponding thereto to the record medium. The hand piece may at times popularly be referred to simply as a microphone, but in the present instance it contains in addition to the microphone, the various controls for the machine as stated in the statement of objects hereinabove. It includes an outer casing or housing 132 of suitable shape and preferably of suitable and known plastic which may be molded with facility. The housing includes a pair of halves 132a and 132b suitably and detachably secured together as by screws. The housing halves include apertures 134 adapted for receiving a jack or switch hook 136 (FIG. 1) on the machine proper which serves to support the hand piece when the latter is not in use, and the weight of the hand piece depresses the hook and opens a control switch 137 (see FIG. 12) which controls certain of the operating parts and functions in the machine, as will be explained below. The switch 137 is of conventional type, suitable spring means being utilized for biasing the jack to an upper position and the switch to appropriate position which for convenience may be a closed postion in the present instance.

The hand piece 130 is shown in open position or disassembled in FIG. 10 and includes various conductors 138 connected between the switch means and other elements in the hand piece and various elements in the machine proper. A cable 140 contains the conductors 138 and terminates at its lower end in a suitable plug 142 (FIG. 2) detachably mounted in a counterpart socket in the machine proper which has appropriate conductors leading to various ones of the controlled elements in the machine.

In the hand piece, and referring again to FIG. 10, is a microphone 144 of suitable and well-known type and arranged for receiving voice impulses through an opening 146 in the housing as illustrated in FIG. 2. The microphone 144 is connected in circuit with the transducer A for transmission of the signals to the transducer. It is also arranged for connection in circuit with the speaker 128 and the transducer, for audibly reproducing signals previously recorded on the record medium, all of which is explained in detail hereinbelow.

The hand piece is provided with switch means 148 of suitable type, indicated also in FIG. 9, having a push button 150 (FIGS. 2 and 9) for controlling a solenoid 152 utilized in the logging operation, as referred to below and disclosed more fully in the co-pending United States Letters Patent application of Charles J. Charvat, Serial No. 604,687, filed August 17, 1956, now Patent No. 3,005,896. If desired a relay 151 may be interposed between the control switch 150 and solenoid 152, as will be understood. The logging operation is carried out through a mechanism illustrated in FIG. 9 associated with the solenoid 152. The armature 154 of the solenoid is pivotally connected to one end of a lever 156 suitably mounted on a frame element of the machine. The opposite end of the lever 156 engages a finger 158 of a bar 160 pivoted at 162 in suitable frame elements of the machine. The bar 160 slidably engages a finger 164 of an indication-making element 166 pivoted on the rod B. The lower end 168 of the element has a piercing element 170 arranged for piercing or perforating a card or sheet 172 removably inserted in a slot 173 formed in a casing element under the lower run of the belt D (see FIGS. 1 and 3). Upon depression of the switch push button 150 the solenoid 152 is energized, and its armature upon being retracted rotates the lever 156 in counterclockwise direction; the extended end of this lever (the right end, FIG. 9) engages the finger 158 and rocks the bar 160 in clockwise direction about the pivot 162, and the bar rotates the indication-making element 166 in counterclockwise direction, whereby the piercing element 170 pierces or perforates the card 172. Upon release of the push button 150 the solenoid 152 is de-energized and the armature which is spring pressed to the extended position rocks the lever 156 in clockwise direction, and gravity moves the indication-making element 166 in clockwise direction to normal inactive position. The element 166 is moved by and with the carriage supporting the transducer head A so as to make indications on the card at locations thereon corresponding to positions of the transducer relative to the record medium D. Further details of the specific construction of the logging mechanism, and the operation thereof may be obtained from the above-mentioned co-pending Charvat application.

Included in the hand piece 130 is a control element 174 which is in the nature of a push button and a pivoted lever. This control element serves as a single control element for a plurality of control operations or functions whereby to control from the hand piece and through the single manipulable element the dictating, reversing, and reproducing operations, at a point remote from the machine proper. This control element 174 includes, as shown in FIG. 10, an outer button 176 for gripping by the hand as by the thumb, for depressing it, or for swinging the lever, or both, as the case may be. This push button 176 is secured to the outer end of a stem or arm 178 pivoted on suitable means such as a stud 180 mounted at a suitable location in the housing such as on a mounting element 182 therein. The arm or stem 178 has a slot receiving a shank portion of the stud 180 for relative sliding movement therebetween, enabling depression of the element 174. A spring 184 biases the element to an outer position. The element 182 has an arcuate flange 186 having a slot guiding the lever 178 in its pivotal movements, this lever also riding in a slot 188 formed at the juncture of the halves of the housing. The lever has shoulders 189 engageable under the flange at the ends of the slot, when the element 174 is depressed, for releasably locking the element in either extreme position of angular movement.

Also mounted on the element 182 is an arcuately shaped insulation strip 190 concentric with the axis of the stud 180. Mounted on this insulation strip are three switch elements 192, 194, and 196 selectively engageable by another switch element 198 on the lever 178. The control element 174 is selectively positionable in either of four positions, namely, an open position which is that shown in FIG. 10 in which the switch element 198 is out of contact with the switch elements 192, 194, and 196. The other three positions are those in which the switch element 198 is in engagement respectively with the switch elements 192, 194, or 196. In normal position of the control element 174, it is biased by the spring 184 to outward position in which the switch element 198 is out of contact with the other switch elements. Upon depression of the control element 174 the switch element 198 engages one or another of the switch elements 192, 194, and 196, depending on which of the three positions the control element is disposed in. Suitable friction means is provided for normally and releasably retaining the control element in any angular position it happens to assume. The switch element 198 closes circuit through the other switch elements 192, 194, and 196, these switch-closed positions corresponding respectively to the switches 200, 202, 204 in the circuit of FIG. 12. When the control element 174 is in switch-open position, or the normal position illustrated in FIG. 10, the switch means 200, 202, and 204 are open, with the result that the circuit is as illustrated in FIG. 12, which may be referred to as a stable condition.

The hand piece 130 includes an indicator bearing element 203 associated with the control element 174. This element 203 may be simply an integral extension of the associated housing half and includes, as shown in FIG. 2, inscriptions "L," "R," and "D," indicating conditions or attitudes of the machine as follows: "Listen," "Reverse," "Dictate," respectively. These letters are located according to the respective positions of the control element 174 for closing circuit through the switch elements 192, 194, and 196, respectively. As indicated in FIG. 2, the control element is in the central position, or the "reverse" position and may be moved to the left to "listen" position and to the right to "dictate" position. When the control element 174 is in the left or "listen" position and is in depressed position, the switch element 198 engages the switch element 192; when it is in its central or "reverse" position, as indicated in FIG. 2, and is depressed, the contact element 198 engages the switch element 194; and when it is in its right-hand position or the "dictate" position and is depressed, the contact element 198 engages the switch element 196. When the control element 174 is released and in retracted position, regardless of its position in association with any of the letters "L," "R," or "D," the switch means 198—192, 194, 196, remain open. As indicated above, when one of the shoulders 189 engages the flange at the respective end of the slot, the element is releasably locked in the respective "L" or "D" position.

Figure 14:
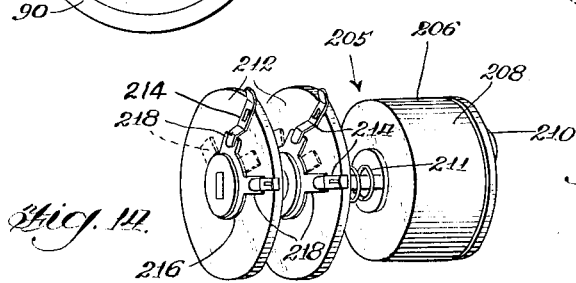
FIG. 14 is a perspective view of a form of relay means found suitable for use in the present machine.

Attention is directed to FIG. 14 which illustrates a preferred form of relay means 205 utilized in the present machine for certain operations. This relay means is of known form and is particularly adaptable to operations in which a plurality of switches are to be operated in unison. The relay means includes a solenoid 206 sometimes referred to as a rotary solenoid. It includes a fixed casing 208 having an armature that is axially movable in response to energization of the solenoid. Secured to the armature is a disc 210 which in response to axial movement of the armature is rotated by cam means interposed between the disc and the casing 208. The armature is also rotated. A return spring 211 is interconnected between the casing and armature biasing the armature rotationally in direction opposite that effected by energization of the solenoid. Mounted on the casing 208 or otherwise stationarily mounted are one or more elements or discs 212 of insulation, each bearing a number of electrical contacts 214. The armature extends through the discs 212 and is provided with switch elements 216 having contact fingers 218 engageable with the contact elements 214. In one position of rotation of the elements 216 the fingers 218 may engage the contact elements 214 as illustrated in the full line position of the element 216, while in another position of rotation the contact finger 218 may be out of contact with the elements 214. It will be understood that the contact elements 214 and 218 may be of any number desired and arranged in any desired manner for opening or closing, or reversing, or performing similar switching operations, as will be understood. The relay means is included in the circuit of FIG. 12 as controlling a plurality of switch means in the upper portion of the circuit, as will be explained more fully hereinafter.

As a further control feature for the dictating machine, means is provided for shutting off the entire circuit when the machine is entirely enclosed by its casing as when set by for the evening, or the weekend. As described in Patent No. 2,926,920, mentioned above, the belt tightener arm 22, on which the roll 16 is mounted, is arranged for controlling such switch means. Attention is directed to FIG. 11 showing the belt tightener arm 22 which is mounted on a pivot means 220. A follower arm 222 is pivotally mounted at an end at 223 in a suitable location in the frame, and has a cam follower 224 engageable selectively with depressions 226 and 228 on the arm 22. The follower arm 222 is biased upwardly to cam following position by a tension spring 230 connected with the arm and with a suitable fixed portion of the machine frame. The belt tightener arm 22 is movable between an extreme lower position shown in full lines in FIGS. 2 and 11 and in an extreme upper position shown in dotted lines in FIG. 2. When the arm 22 is in its lower position, it is held in such position by gravity, and when it is moved to its extreme upper position, the cam follower 224 falls into depression 228 and releasably retains the arm in such upper position. When it is in its upper position, a finger 232 on the arm 22 engages a switch control lever 234 of a switch 236. When the belt tightener arm 22 is thus in its extreme upper position and the cam follower 224 is engaged in the depression 228, the switch 236 is accordingly control-conditioned, which in the present case is in open position. The operating parts exposed in FIG. 2 are arranged to be enclosed or covered by a cover member (not shown)

and in order to maintain these parts in a minimum and compact space, the belt tightener arm is raised to its extreme upper position. In such position and when the parts mentioned are covered, the machine is in condition for setting aside for a period of time. In such condition, the entire circuit is preferably open or de-energized as was explained above. The switch means 236 is shown in the lower left-hand corner of the circuit of FIG. 12. The belt tightener arm 22 may also be releasably retained in an intermediate position, such as shown in broken lines in FIG. 2, for facilitating placement of the record medium on the rolls 14 and 16 and removing it therefrom. When the belt tightener arm 22 is in such position, the cam follower 224 (FIG. 11) is received in the depression 226 and it thereby releasably retains the belt tightener arm in such position.

The machine is provided with a suitable amplifier shown diagrammatically at 238 in FIG. 12, as will be mentioned again hereinbelow in connection with the circuit of FIG. 12, and it includes a suitable volume control arrangement of conventional kind. The amplification is preferably controlled individually for dictating and playing back, so as to more readily accommodate the individual operator in transcription of the recorded material. A volume control 240 (FIG. 1) is shown diagrammatically as a disc mounted on a rotatable shaft in a conventional manner. This control is provided for controlling the volume in playing back or transcribing, and is positioned for easy access to the transcribing operator, as is desired in view of the fact a transcribing operator would usually have occasion to manipulate it more often than would a person dictating. A suitable volume control (not shown) is also provided for the latter, but in this case it would be manipulated only rarely and for that reason may be in the form of an adjusting screw on the bottom side of the machine or other suitable location.

Visual means is provided for indicating the condition or attitude of the machine, i.e., whether the machine is in dictating condition, listening condition. FIG. 1 shows the machine proper quite generally as it would appear to the operator, and the machine includes a panel 242 which when in the position of the machine shown, is exposed to the view of the operator, and which bears indicia such as numerals 244 indicating the position of the transducer head A along its path of movement transverse to the record medium or belt D. This panel is transparent and serves as a convenient arrangement for placing signal lamps therebehind which show up readily to the operator. It is desired particularly that a plain signal be given when the machine is in dictating condition or attitude. It is preferred that a red light be utilized for indicating this position or attitude and it is satisfactory that all other conditions or attitudes be indicated by a single light of different color. In the present instance a red light provided by a lamp 246 (FIG. 12) is arranged for indicating the dictating condition or attitude, while a green lamp 248 (FIG. 12) is provided for indicating all other operating conditions or attitudes, such as listening, reversing, etc. These lamps are mounted in a suitable manner in the machine, the details of which need not be given.

Figure 13:
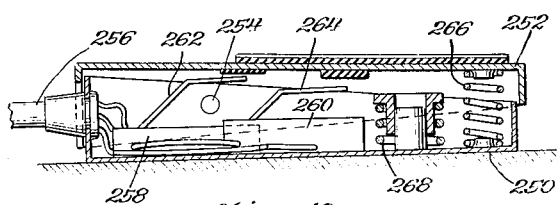
FIG. 13 is a vertical sectional view of a foot control instrument adapted for use in a transcribing operation.

Dictating machines are usually provided with a control device for use by the transcriber selectively attachable thereto in place of the hand piece 130. In a transcribing operation there is no need, of course, for provision for dictating or recording. Normally the operator in a transcribing operation turns the machine on to listen to a portion of the material recorded, and since typing the material requires considerably longer period than continuous speech dictating the same material, the operator must stop the machine during portions of the transcribing operation. It is also desired, at least at times, to reverse the machine to hear again portions of the dictated material because of indistinctness, etc. Therefore, the transcribing operation requires control for starting the machine in forward direction, and stopping it, and reversing the machine. It is desirable that the transcribing operator be able to control the machine by foot control. A suitable control device for this purpose is illustrated in FIG. 13. This device is generally flat and will lie on the floor. It includes a lower member 250 which is supported on the floor and an upper member 252 hingedly or pivotally mounted on the lower member by means such as screws 254. A cable containing electrical conductors 256 leads to the device, the conductors of which lead to switches 258 and 260, which have control arms 262 and 264, respectively. The upper member 252 is normally retained in upper position by a compression spring 266 which is relatively weak. In the upper position of the upper member 252, as shown in the drawing, in which it is retained by the spring 266, both of the switches 258 and 260 are open. When it is desired to put the machine into operation, e.g., in forward direction, the operator compresses the upper member 252 against the action of the spring 266, which depresses the switch arm 262 and closes the switch 258. A second compression spring 268 of substantially greater strength but the spring 266 is provided and is of lesser length so that it will not be engaged and depressed by the upper member 252 until the latter is depressed a substantial amount. The spring 268 is of such strength that normally the operator's foot will sense when the upper member 252 engages it, and the operator will be able to avoid further depression against the spring 268 while maintaining the upper member 252 in a firm position in engagement therewith. In such halfway position, the switch 258 is in its new control position, which in the present instance may be closed. The upper member 252 may thus be depressed and released repeatedly for operating the machine in forward direction, for example, without accidentally or inadvertently depressing the upper member 252 an extent greater than desired.

When it is desired to reverse the machine the operator puts substantially greater pressure on the upper member 252 and depresses it fully against the action of the spring 268, whereupon the switch control lever 264 is depressed and the switch 260 is accordingly controlled, such as by closing it. Thus the operator is able to actuate the control device accurately in forward direction and reverse direction, selectively, and to release the pressure in either of the switch closed positions, without accidentally or inadvertently operating the device to a condition other than that desired. The control device thus has three positions, namely, an open or normal position in which the switch means 258 and 260 are open; a second position in which the upper member 252 is depressed to the halfway position and the switch 258 is closed; and a third position in which the upper member 252 is entirely depressed and the switch means 260 is closed. It will be understood that the switching arrangement as controlled by the switches 258 and 260 may be as desired in accordance with switching and circuit arrangements of known character. For example, it may be desired that the switches 258 and 260 are opened, rather than closed, in response to depression of the control levers. On the other hand, if they are closed in response to such operation, the switch 260 may be arranged for effecting opening of the switch 258 upon closing of the switch 260. Another possible arrangement is that the switch 258 is normally open and is closed by the upper member 252 when the latter is moved to its halfway position, and again opened when the member 252 is moved to its full depressed position. It will be understood that the two "on" positions are for operating the machine in forward and reverse directions, respectively. In forward direction, the machine is conditioned for listening, and there is of course no provision for a dictating condition. The cable 256 is provided with a plug for insertion in the socket in which the plug 142 is inserted, after removal of the latter when it is desired to substitute the control for the hand piece 130.

Figure 12:
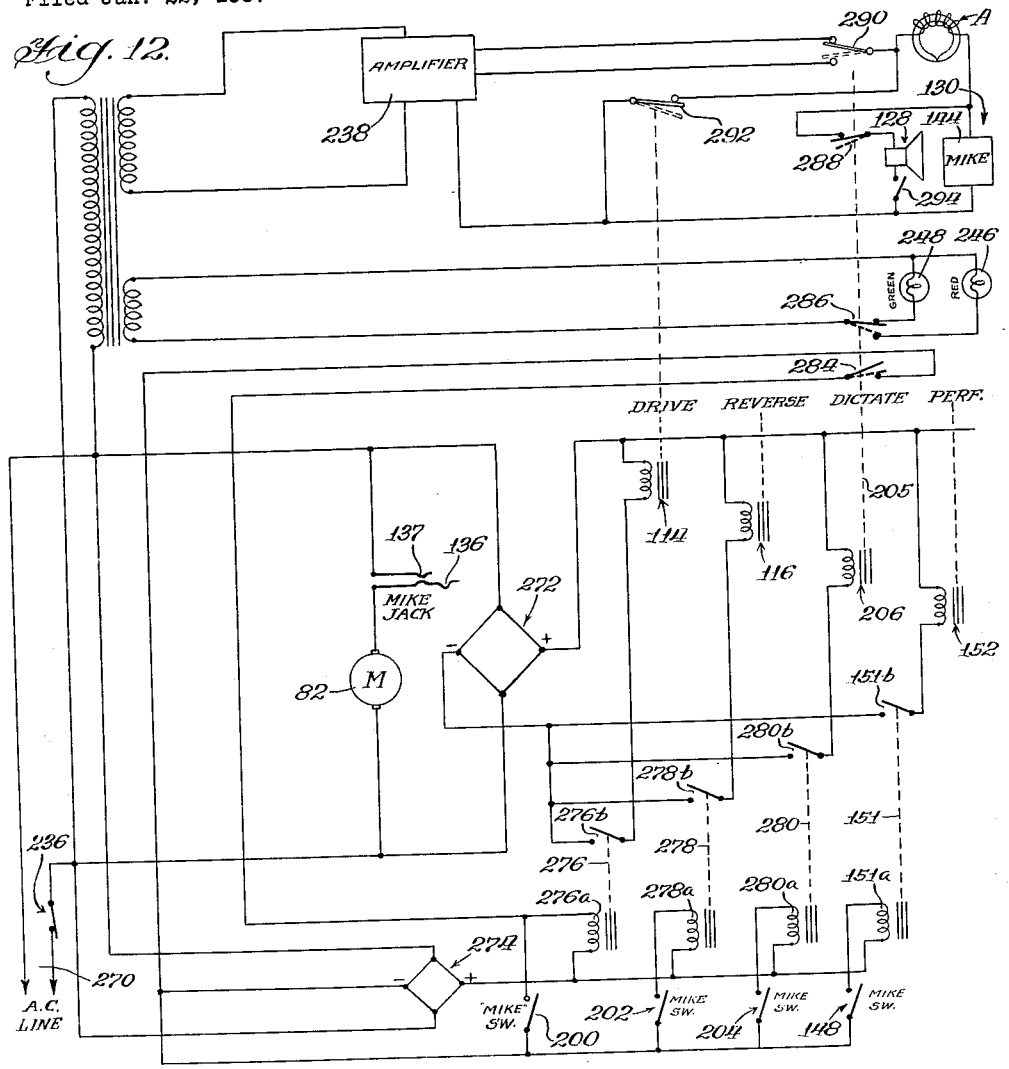
FIG. 12 is a diagram of the electrical circuit employed in the machine.

The switch 258 corresponds to the switch 200 in the hand piece and indicated in FIG. 12, and thus when the upper member 252 is depressed to the intermediate position, and the switch 258 is closed, the relay 276 is energized and the drive solenoid 114 is energized. The machine is thereby driven in forward direction. Energization of the solenoid 114 also opens the mute switch 292 which is described hereinbelow. The switch 260 corresponds to the reverse switch 202 in the hand piece and indicated in FIG. 12. When the member 252 is fully depressed, the switch 260 is closed with the result that the relay 278 is energized and the solenoid 116 is energized for driving the machine in reverse direction.

Attention is next directed to the circuit diagram of FIG. 12 in the following description of the operation of the device which also includes references to certain elements of construction of the machine hereinabove referred to. A suitable current source is indicated at 270 and the switch 236 is in circuit therewith, as indicated above. When the belt tightener arm 22 is in lowered position, the switch 236 is closed. The hand piece 130, being removed from the hook 136 (see FIGS. 1 and 12), as, of course, it must be for a dictating operation, the switch 137 is enabled to close. The circuit through the motor 82 is therefore closed and the motor is set in operation. The source of current is electrically connected to rectifying means 272 which in turn is connected to the solenoids 114, 116, 206, and 152, all referred to above. Also in circuit with the source is another rectifying means 274 for relay means for controlling the solenoids 114, 116, 206, and 152. These relay means are indicated at 276, 278, 280, and 151, each including a solenoid and a switch indicated by the main reference numeral with the postscript *a* and *b* respectively. The switches of these relays are normally in open position as indicated in the circuit. The relays are controlled and the corresponding switch means closed under the control of switches 200, 202, 204, and 148, respectively, incorporated in the hand piece, which, in the operation of the machine, is at a point remote from the machine proper or the main portion of the machine, as explained fully hereinabove.

In the following description of the operation of the machine, reference is made first to the dictating condition or attitude of the machine, and the function of the various parts thereof in that condition. The relay 205, shown in FIG. 12 and described above, includes in addition to the solenoid 206, a plurality of switches among which are 284, 286, 288, and 290, arranged to operate in gang and in fact are the switch means represented by the contact elements 214 and 218 described in connection with FIG. 14. It will be understood that the elements 214 and 218 are indicative, the switch means actually being used being of any desired number for performing the desired operations, and they include, in addition to those just mentioned, other switches as well for controlling certain other functions not described herein. When it is desired to dictate, the operator places a belt D on the machine and lowers the belt tightening arm 22 to the full line position of FIG. 2. The switch 236 is thus closed. He also removes the hand piece 130 from the hook 136 and the switch 137 is consequently closed. The motor 82 is thus set in operation and the circuit is otherwise conditioned for further functioning. The operator then moves the control element 174 to the extreme right position (FIGS. 2 and 10) in register with the "D" position and depresses it. The switch element 198 then engages the switch element 196 and closes switch means which includes the switch 204 in the circuit of FIG. 12. This switch actuates relay 280 and energizes the solenoid 206 which then through its armature moves the various switches 284, 286, 288, and 290 from the full line positions to the dotted line positions in FIG. 12. The switch 284 is thus closed and closes circuit through the relay 276 which in turn energizes the solenoid 114 which effects forward drive of the belt D as explained above. Specifically, energization of the solenoid 114 results in retraction of its armature (FIG. 5) and enables the slide plate 98 to be moved under the action of the spring 108 which moves the idler friction wheel 88 from the dotted line position to the full line position of FIG. 7.

The switch means 286 in this same operation is moved to its lower dotted line position of FIG. 12, which then closes the circuit through the red lamp 246 to indicate a dictating condition or attitude of the machine as explained above.

The switch means 288 is opened by the energized solenoid 206, which cuts out the speaker 128 from the circuit as is, of course, desired in the dictating operation.

The switch means 290 in this same operation, namely, the dictating operation, when the relay 205 is energized, is moved from the full line position to the dotted line position indicated.

The switch 290 is connected in circuit with the amplifier 238, transducer head A and microphone 144 for selectively conditioning the transducer head for a recording or a reproducing function. When the switch is moved to the dotted line position in the dictating operation, in the manner just described, the transducer head is conditioned for recording. The switch is biased to the full line position, and when it is in the latter position the transducer is conditioned for reproducing. Both of these conditions are, however, controlled by the mute switch 292. This switch may be arranged in any suitable manner for control by the solenoid 114, and preferably as shown in FIG. 5. It is normally closed, but upon energization of the solenoid and retraction of the armature thereof, it is opened, as will be understood from FIG. 5. The switch is arranged for shunting the circuit portion containing the transducer head (FIG. 12) and muting the latter when it is closed, but when it is opened, the transducer head can be conditioned for recording or reproducing selectively, as explained. The transducer head is therefore conditioned in the recording and reproducing operations but at all other times muted.

In recording or dictating condition of the machine the voice impulses received in the microphone are transmitted in the form of signals to the transducer head A which records the signals on the record medium or belt D. Upon cessation of the dictating operation, the control element 174 is released, which is then moved to its outer switch-open position by the spring 184, and the switch means 284, 286, 288, 290 move to their full line positions of FIG. 12. The red lamp 246 is extinguished and the green lamp 248 is lighted. In the preferred arrangement of the machine it is desired that the green lamp 248 be lighted at all times except during the dictating operation when it is extinguished and the red lamp 246 is lighted.

Assume next that the operator wishes to reverse the record medium or belt D, e.g., in order to position the machine for playing back or listening to a portion of the material previously dictated. To perform this operation he moves the control element 174 angularly to the "reverse" position which is the central position in register with the letter "R" and as shown in FIG. 2. He then depresses it, which makes contact between switch elements 198 and 194 and closes switch means which include the switch 202 of FIG. 12. The relay 278 is thus energized to close its switch 278*b*. When that is done the solenoid 116 is energized and reversal of the record medium or belt takes place as explained above. Specifically, upon energization of the solenoid 116 (FIGS. 5 and 6) the bell crank lever 120 is rocked in counterclockwise direction, which moves the reverse idler friction wheel 90 from the dotted line position to the full line position of FIG. 8, which effects reverse movement of the belt and corresponding operations, such, for example, as movement of the transducer head A in reverse direction. During this reversing operation, the transducer head is muted, as was explained above. Upon release of the control element 174, it is moved to retracted or outer position by the spring 184 and it breaks contact between the switch element 198 and 194 and opens the switch 202.

After the machine has been thus reversed the desired extent, the operator moves the control element 174 to the left-hand position, as viewed in FIG. 2, in register with the indication "L" and depresses it. Contact is then made between switch elements 198 and 192 which close certain switch means which include the switch 200 of FIG. 12. This switch closes the circuit to energize the relay 276 which, in turn, closes the circuit to energize the drive solenoid 114 in the manner described above. In this operation, however, the transducer head A is not in recording condition, as was explained above, so as not to obliterate the signals previously recorded.

In the listening or playing back operation, the signals are reproduced audibly which may be done through the microphone 144, or through the speaker 128, as explained below. The speaker 128 is provided as an alternate means for reproducing the signals which may be desired by the transcribing operator. To provide the choice with respect to the speaker, switch means 294 is provided for placing the speaker 128 in circuit in the listening operation. This switch 294 is preferably a manually operated switch placed at any location in the machine convenient to the operator. For the accommodation of the transcribing operator, an earphone, of known kind, may be provided as an alternative to the speaker. Such earphone is normally used only with the control of FIG. 13 and may for convenience be detachably connected thereto as in the plug thereon which is plugged into the socket alternatively receiving the plug 142 (FIG. 2).

In addition to the operation and the controlling functions of the machine explained above, the operator in a dictating operation can with equal facility actuate the perforating or logging means, explained in connection with FIG. 9, by depression of the switch control button 150 which is located in the hand piece 130.

The operator can perform practically all operations in connection with operating the dictating machine, by manipulating the hand piece, with the exception of placing the record medium thereon and removing it therefrom, and putting the transducer head A in transducing position relative to the record medium. He can, through the controls located entirely in the hand piece, effect the desired control of the machine with extreme flexibility; the machine can be operated for dictating; the machine can be reversed simply by a manual manipulation of the control element in the hand piece, whereby the record belt and the transducer head are reversed and the transducer head is deenergized; after the reversing operation the machne can be made to operate again in forward direction for reproducing the signals previously recorded, which may be done without obliterating the signals, all as controlled by the remote hand piece.

If the machine should be in the dictating position or attitude, and inadvertently be moved therefrom, as, for example, accidentally pulling the plug of the cable of the hand piece out of the machine proper, the machine automatically resumes a non-dictating condition or attitude. The return spring 211 in the relay means 205 of FIG. 14 returns the relay to its normal or de-energized or oven open position, and the switches 284, 286, 288, and 290 automatically move to the full line positions of FIG. 12, and, if, for example, the transcribing operator should operate the machine so that the transducer head retraces the signal path on the record medium, none of the signals will be obliterated or impaired.

While I have shown herein a certain preferred embodiment of the invention, it will be understood that changes may be made therein within the scope of the appended claims.

I claim:

1. In a dictating machine, a belt magnetic record medium, means for freely demountably supporting the record medium for movement in a continuous path, driving means, a drive train connecting the driving means with the record medium for driving the latter in a forward direction, a transducer movable into and out of a transducing position relative to the record medium, means interconnecting the record medium and transducer for moving the latter transversely along the record medium when it is in said transducing position for tracing a path on the record medium, said transducer being also manually movable relative to the record medium when it is out of transducing position, a solenoid for establishing connection in the drive train, means for energizing said transducer, a hand piece remotely positionable relative to the remaining portion of the machine, circuit means for energizing said solenoid and transducer, circuit means for energizing said solenoid and de-energizing said transducer, a relay circuit for controlling each said circuit means, and switch means including a manipulable element in said hand piece for selectively controlling said relay circuits, said manipulable element constituting the sole manipulable means required for effecting the controlling functions mentioned.

2. In a dictating machine, a belt magnetic record medium, means for freely demountably supporting the record medium for movement in a continuous path, driving means, a drive train connecting the driving means with the record medium for driving the latter in each a forward and a reverse direction, a transducer movable into and out of a transducing position relative to the record medium, means interconnecting the record medium and transducer for moving the latter relative to the record medium when it is in said transducing position for tracing a path on the record medium, a solenoid for establishing connection in each drive train, means for energizing said transducer, a hand piece remotely positionable relative to the remainder of the machine, circuit means for energizing the forward-drive solenoid and energizing the transducer, circuit means for energizing the forward-drive solenoid and de-energizing the transducer, circuit means for energizing the reverse-drive solenoid and de-energizing the transducer, a relay circuit for each said circuit means, and switch means including a manipulable element in said hand piece for selectively controlling said relay circuits, said manipulable element constituting the sole manipulable means required for effecting the controlling functions mentioned.

3. In a dictating machine, a magnetic record medium, driving means, a drive train connecting the driving means with the record medium for driving the latter in each a forward and a reverse direction, a transducer movable into and out of a transducing position relative to the record medium, means interconnecting the record medium and transducer for moving the latter relative to the record medium when it is in said transducing position for tracing a path on the record medium, a solenoid for establishing connection in each drive train, means for energizing said transducer, a hand piece remotely positionable relative to the remainder of the machine, circuit means for energizing the forward-drive solenoid and energizing the transducer, circuit means for energizing the forward-drive solenoid and de-energizing the transducer, circuit means for energizing the reverse-drive solenoid and de-energizing the transducer, a relay circuit for each said circuit means, and switch means including a manipulable element in said hand piece for selectively controlling said relay circuits, said manipulable element having a normal rest position in which none of said circuits are energized, and an "on" position for each circuit, said switch means also including yieldable means biasing the element from each "on" position to the normal rest position.

4. In a dictating machine, a magnetic record medium, driving means, a drive train connecting the driving means with the record medium for driving the latter in each a forward and a reverse direction, a transducer movable into and out of a transducing position relative to the record medium, means interconnecting the record medium and transducer for moving the latter relative to the record medium when it is in said transducing position for tracing a path on the record medium, a solenoid for establishing connection in each drive train, means for energizing said transducer, a hand piece remotely positionable relative to the remainder of the machine, circuit means for energizing the forward-drive solenoid and energizing the transducer, circuit means for energizing the forward-drive solenoid and de-energizing the transducer, circuit means for energizing the reverse-drive solenoid and de-energizing the transducer, a relay circuit for each said circuit means, and switch means including a manipulable element in said hand piece for selectively controlling said relay circuits, said manipulable element having a normal rest position in which none of said circuits are energized, and an "on" position for each circuit, said switch means also including yieldable means biasing the element from each "on" position to the normal rest position, said element being relatively projected when in the normal rest position and depressible therefrom to an "on" position and being movable serially from one "on" position to another directly without passing through "off" position.

5. In a dictating machine, a belt record medium, means for freely demountably supporting the record medium for movement thereof in an endless path, a transducer mounted for movement into and out of a transducing position relative to the record medium and movable transversely of the record medium, means operable when the transducer is in transducing position for interconnecting the record medium and transducer for conjoint movement in each a forward and a reverse direction for tracing a linear path on the record medium, means for selectively driving the record medium and transducer in forward and reverse directions, the transducer when out of transducing position being detached from said interconnecting means and movable transversely of the record medium independently of movement of the record medium, a hand piece, means connecting the hand piece to the body of the machine for remote positioning of the hand piece and free movement thereof within predetermined limits, mouthpiece means in the hand piece for receiving voice impulses, means for converting the voice impulses to signals and transmitting them to the transducer, means for energizing the transducer, and control means including manipulable means in the hand piece for selectively controlling the driving means, transducer and signal transmitting means, said manipulable means constituting the sole manipulable means required for effecting the controlling functions mentioned.

6. The invention set forth in claim 5 in which said manipulable means is constituted by a single manipulable element.

7. The invention set forth in claim 5 in which the control of the transducer includes control of the movement thereof and energization of it when it is moved in forward direction.

8. The invention set forth in claim 5 in which said driving means includes a drive train for each said forward and reverse direction and a solenoid is provided for energizing each drive train, said control means includes a switch and manually actuated control button for selectively energizing said solenoids.

References Cited in the file of this patent

UNITED STATES PATENTS

| | | |
|---|---|---|
| 2,572,596 | Camras | Oct. 23, 1951 |
| 2,581,499 | Roberts | Jan. 8, 1952 |
| 2,698,822 | Payne | Jan. 4, 1955 |
| 2,813,686 | Schroter | Nov. 19, 1957 |
| 2,822,426 | Dinsmore | Feb. 4, 1958 |
| 2,883,476 | Dermond et al. | Apr. 21, 1959 |
| 2,899,506 | Wehmer | Aug. 11, 1959 |
| 2,926,920 | Lorenz | Mar. 1, 1960 |
| 2,930,855 | Blakistone | Mar. 29, 1960 |
| 2,951,127 | Pierson et al. | Aug. 30, 1960 |

FOREIGN PATENTS

| | | |
|---|---|---|
| 649,260 | Great Britain | Jan. 24, 1951 |